(12) United States Patent
Tanno et al.

(10) Patent No.: US 9,108,373 B2
(45) Date of Patent: Aug. 18, 2015

(54) PNEUMATIC TIRE AND METHOD OF MANUFACTURING THE SAME

(75) Inventors: Atsushi Tanno, Hiratsuka (JP); Ayako Jyouza, Hiratsuka (JP)

(73) Assignee: The Yokohama Co., LTD. (JP)

( * ) Notice: Subject to any disclaimer, the term of this patent is extended or adjusted under 35 U.S.C. 154(b) by 0 days.

(21) Appl. No.: 13/423,904

(22) Filed: Mar. 19, 2012

(65) Prior Publication Data

US 2012/0291933 A1 Nov. 22, 2012

(30) Foreign Application Priority Data

May 18, 2011 (JP) .................. 2011-111131

(51) Int. Cl.
| | | |
|---|---|---|
| *B60C 23/04* | (2006.01) | |
| *B60C 23/00* | (2006.01) | |
| *B60C 19/00* | (2006.01) | |
| *B60C 1/00* | (2006.01) | |
| *B29D 30/00* | (2006.01) | |
| *B60C 19/12* | (2006.01) | |
| *B60C 5/14* | (2006.01) | |

(52) U.S. Cl.
CPC .......... *B29D 30/0061* (2013.01); *B60C 19/002* (2013.04); *B60C 23/0493* (2013.01); *B29D 2030/0072* (2013.01); *B60C 5/14* (2013.01); *B60C 19/001* (2013.01); *B60C 19/003* (2013.01); *B60C 19/122* (2013.04); *B60C 2019/004* (2013.04); *B60C 2019/006* (2013.04); *B60C 2019/007* (2013.04); *Y10T 152/10495* (2015.01)

(58) Field of Classification Search
CPC ...... B60C 5/14; B60C 19/002; B60C 19/003; B60C 19/122; B60C 2019/004; B60C 2019/006; B60C 2019/007
USPC .................................................. 152/510, 450
IPC ....................................................... B60C 19/00
See application file for complete search history.

(56) References Cited

U.S. PATENT DOCUMENTS

| | | | |
|---|---|---|---|
| 5,938,869 A | | 8/1999 | Kaido et al. |
| 2009/0314403 A1* | | 12/2009 | Tanno ........................... 152/157 |
| 2010/0032073 A1* | | 2/2010 | Tanno et al. .................. 152/532 |
| 2010/0276048 A1* | | 11/2010 | Adamson et al. ............. 152/450 |

FOREIGN PATENT DOCUMENTS

JP 08258506 A * 10/1996

(Continued)

OTHER PUBLICATIONS

Machine Translation: JP2008-230411; Uchiumi, Atsuro; No date.*

(Continued)

*Primary Examiner* — Richard Crispino
*Assistant Examiner* — Kendra Ly
(74) *Attorney, Agent, or Firm* — Thorpe North & Western (57) ABSTRACT

A pneumatic tire including a resin layer on at least a portion of the tire inside surface, the resin layer being formed from a thermoplastic resin or a thermoplastic elastomer composition in which an elastomer is dispersed in a thermoplastic resin. The pneumatic tire is provided with a fastener including a base material formed from a thermoplastic resin and engaging elements formed on the base material. Additionally, the base material of the fastener is fixed to the resin layer via fusion bonding.

25 Claims, 8 Drawing Sheets

(56) References Cited

FOREIGN PATENT DOCUMENTS

| JP | 2006044503 | A | * | 2/2006 | | |
| JP | 2006-168447 | | | 6/2006 | | |
| JP | 2008230411 | A | * | 10/2008 | .............. | B60C 19/00 |
| JP | 2008-272954 | | | 11/2008 | | |

OTHER PUBLICATIONS

Machine Translation: JP2006-044503; Tanno, Atsushi; no date.*
Machine Translation: JP08-258506; Kaido et al.; no date.*
Office Action received for Chinese Patent Application No. 201210156579.1 mailed Aug. 4, 2014, 12 pages, China.

* cited by examiner

PNEUMATIC TIRE AND METHOD OF MANUFACTURING THE SAME

PRIORITY CLAIM

Priority is claimed to Japan Patent Application Serial No. 2011-111131 filed on May 18, 2011.

BACKGROUND

1. Technical Field

The present technology relates to a pneumatic tire provided with a fastener for attaching, as necessary, an affixture such as a noise absorbing member or the like to a tire inside surface, and a method for manufacturing the same. More particularly, the present technology relates to a pneumatic tire whereby, even when a resin layer is provided on at least a portion of the tire inside surface, the fastener can be strongly bonded to the resin layer. Moreover, the present technology also relates to a method for manufacturing the same.

2. Related Art

Conventionally, pneumatic tires provided with surface fasteners on the tire inside surface in order to facilitate the attaching of affixtures such as noise absorbing members and the like have been proposed (e.g. see Japanese Unexamined Patent Application Publication No. 2008-272954A). In pneumatic tires, a noise absorbing member is provided in the cavity portion in order to reduce resonance generated in the cavity portion, and with the pneumatic tire provided with surface fasteners described above, affixtures such as noise absorbing members and the like can, as necessary, be easily attached and removed. When attaching the surface fasteners on the tire inside surface, anchoring elements, for example, are provided on a back side of the surface fasteners and the surface fasteners are vulcanization bonded to the tire inside surface in a state where the anchoring elements are driven into the rubber of the tire inside surface. Thereby, bonding strength of the surface fasteners is sufficiently ensured.

On the other hand, pneumatic tires have been proposed that are provided with a resin layer on the tire inside surface as an air barrier layer (e.g. see Japanese Unexamined Patent Application Publication No. 2006-168447A). In such pneumatic tires, surface fasteners must be attached to the resin layer when surface fasteners are to be provided on the tire inside surface. However, in a pneumatic tire where a resin layer having air barrier functionality is disposed on the tire inside surface, from the perspective of ensuring hermeticity, it is unfavorable to use surface fasteners provided with anchoring elements. Additionally, in cases where an adhesive is used to fix surface fasteners to a resin layer, the bonding strength thereof may not always be sufficient and, moreover, it is difficult to ensure bonding strength over an extended period of time. Therefore, currently, it is difficult to provide surface fasteners on a tire inside surface in a state of strong bonding in pneumatic tires provided with a resin layer on the tire inside surface.

SUMMARY

The present technology provides a pneumatic tire whereby, even when a resin layer is provided on at least a portion of the tire inside surface, a fastener can be strongly bonded to the resin layer, and a method for manufacturing the same. A pneumatic tire of the present technology has a resin layer on at least a portion of a tire inside surface, the resin layer being formed from a thermoplastic resin or a thermoplastic elastomer composition in which an elastomer is dispersed in a thermoplastic resin. The pneumatic tire is provided with a fastener including a base material formed from a thermoplastic resin and an engaging element formed on the base material, and the base material of the fastener is fixed to the resin layer via fusion bonding.

Additionally, a method for manufacturing the pneumatic tire of the present technology that achieves the object described above includes: vulcanizing a pneumatic tire having a resin layer on at least a portion of a tire inside surface, the resin layer being formed from a thermoplastic resin or a thermoplastic elastomer composition in which an elastomer is dispersed in a thermoplastic resin; thereafter, disposing a fastener including a base material formed from a thermoplastic resin and an engaging element formed on the base material along the resin layer; and fixing the base material of the fastener to the resin layer by fusion bonding.

In the present technology, a pneumatic tire has a resin layer on at least a portion of a tire inside surface, the resin layer being formed from a thermoplastic resin or a thermoplastic elastomer composition. The pneumatic tire uses a fastener including a base material formed from a thermoplastic resin and an engaging element formed on the base material, and the base material of the fastener is fixed to the resin layer via fusion bonding. Thereby, the fastener can be strongly bonded to the resin layer on the tire inside surface.

The step of fixing the base material of the fastener to the resin layer via fusion bonding can be performed after vulcanizing the pneumatic tire. Therefore, crushing of the engaging element of the fastener when vulcanizing can be avoided. Moreover, conventional molding and vulcanization processes of the pneumatic tire may be used, while only simply adding a process of attaching the fastener via fusion bonding. Additionally, a common fabrication operation can be used for any tire size because the fusion bonding is not dependent on tire size. Furthermore, when fusion bonding, there is no need to remove a mold release agent adhered to the tire inside surface after vulcanization. The base material of the fastener is particularly preferably fixed to the resin layer via ultrasonic fusion bonding. If ultrasonic fusion bonding is used, the base material of the fastener can be easily fixed to the resin layer in a short period of time.

In the present technology, the difference between the melting point of the base material of the fastener and the melting point of the resin layer is preferably not greater than 40° C. Particularly, the constituent material of the base material of the fastener is preferably the same type of thermoplastic resin as the resin included in the resin layer. In this case, the base material of the fastener can be fixed to the resin layer via fusion bonding and the bonding strength thereof can be sufficiently ensured.

The portion of the resin layer where the fastener is fixed is preferably not less than 15% thicker than other portions. When fixing the base material of the fastener to the resin layer via fusion bonding, localized thinning of the resin layer may occur, but functionality as an air barrier layer can be sufficiently maintained due to the thickness of the resin layer being increased at the portion where the fastener is fixed.

A fusion bonding support film formed from the same type of thermoplastic resin as the resin included in the resin layer is preferably laminated in at least a region where the fusion bonding is performed, on a back side of the base material of the fastener. The bonding strength between the fastener and the resin layer can be increased by adding such a fusion bonding support film.

The disposal region of the fastener on the tire inside surface is not particularly limited, but the fastener is preferably disposed in a region of the tire inside surface corresponding to the tread portion. Such a configuration is beneficial because fusion bonding in such a region is easy and, moreover, durability of the resin layer is excellent.

In a pneumatic tire including main grooves extending straight in a tire circumferential direction in a tread portion, and a plurality of rows of land portions partitioned by the main grooves, the fastener is preferably disposed in a region of the tire inside surface corresponding to the tread portion, and the fusion bonding of the base material of the fastener is preferably performed continuously or intermittently along the tire circumferential direction at positions in the tire width direction corresponding to the land portions. In this case, pressure when fixing the base material of the fastener to the resin layer via fusion bonding will be supported by the land portions and processing accuracy can be enhanced.

In the present technology, an affixture comprising a second fastener that pairs with the fastener can be attached to the tire inside surface by mutually engaging this pair of fasteners. A noise absorbing member is preferably used as the affixture.

DETAILED DESCRIPTION

Figure 1:
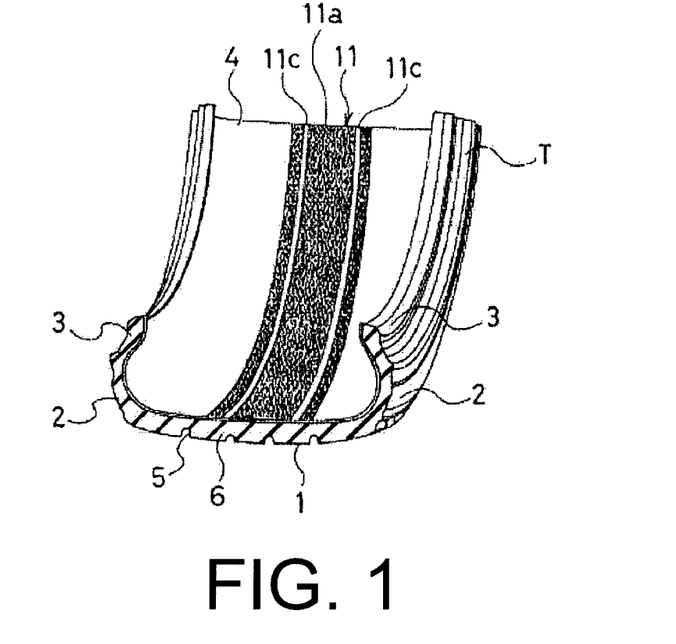
FIG. 1 is a perspective view illustrating a pneumatic tire formed according to an embodiment of the present technology, cut away at a meridian cross-section.
Figure 2:
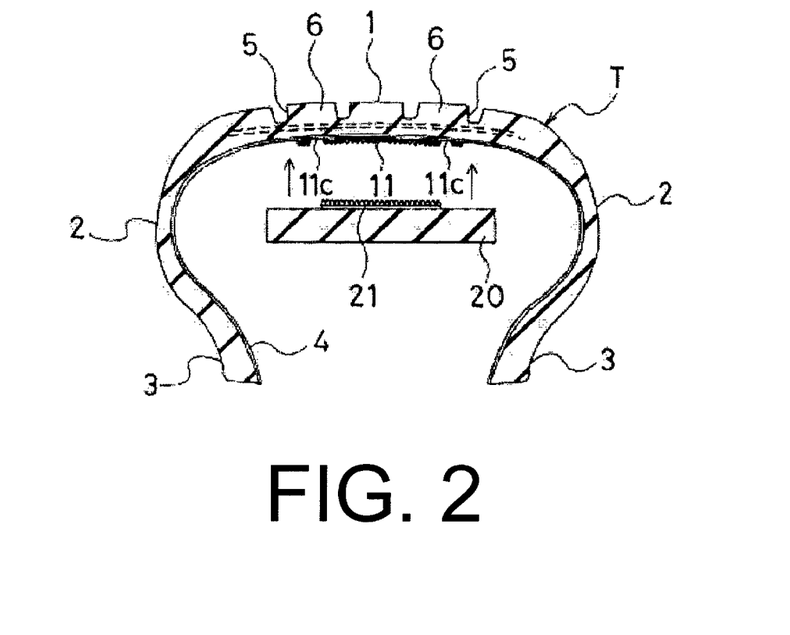
FIG. 2 is a meridian cross-sectional view illustrating a pneumatic tire formed according to the embodiment of the present technology.
Figure 3:
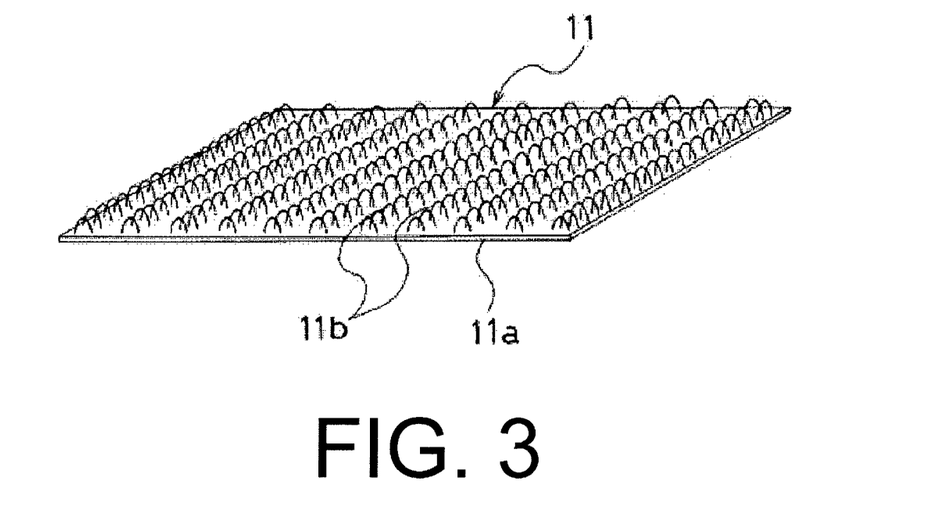
FIG. 3 is a perspective view illustrating an example of a fastener used in the present technology.
Figure 4:
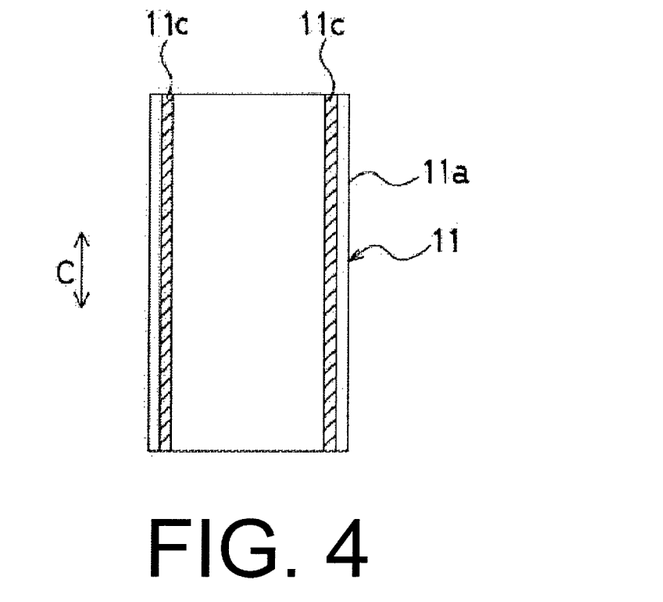
FIG. 4 is a plan view illustrating a state where the fastener of FIG. 3 is fusion bonded.
Figure 5:
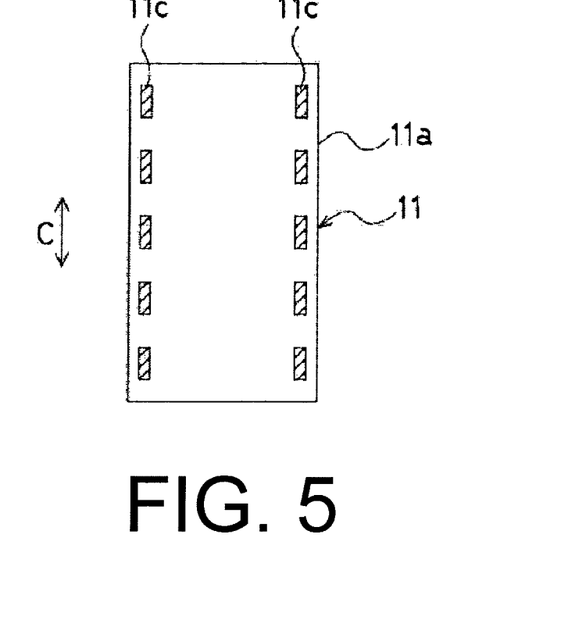
FIG. 5 is a plan view illustrating another state where the fastener of FIG. 3 is fusion bonded.

Detailed descriptions will be given below of a configuration of the present technology with reference to the accompanying drawings. FIGS. 1 and 2 illustrate a pneumatic tire formed according to an embodiment of the present technology, and FIGS. 3 to 5 illustrate a fastener used in the present technology.

In FIGS. 1 and 2, a pneumatic tire T is provided with a tread portion 1 that forms an annular form extending in a tire circumferential direction, side wall portions 2 that are disposed on both sides of the tread portion 1, and a pair of bead portions 3 that is disposed on both sides in a tire width direction of the side wall portions 2. A resin layer 4 is formed on an entirety of an inside surface of the pneumatic tire T as an air barrier layer. The resin layer 4 is constituted from a thermoplastic resin or a thermoplastic elastomer composition in which an elastomer is dispersed in a thermoplastic resin.

As illustrated in FIGS. 1 and 2, a fastener 11 is attached in a region of the inside surface of the pneumatic tire T corresponding to the tread portion 1. The fastener 11, as illustrated in FIG. 3, is constituted from a sheet-like base material 11a that is formed from a woven fabric made from a thermoplastic resin, and multiple loop-like engaging elements 11b that are formed on the base material 11a. In this case, the engaging elements 11b constitute a portion of the woven fabric made from thermoplastic resin. Examples of the woven fabric made from thermoplastic resin that can be used include woven fabrics made from nylon fiber. The fastener 11 constitutes one side (loop member) of a hook-and-loop surface fastener. The base material 11a of the fastener 11 is fixed to the resin layer 4 via fusion bonding. A fusion bonded portion 11c of the fastener 11 (depicted by diagonal lines), as illustrated in FIG. 4, may be formed continuously along a tire circumferential direction C or, alternately, as illustrated in FIG. 5, may be formed intermittently along the tire circumferential direction C. However, when the fusion bonded portion 11c of the fastener 11 is formed intermittently along the tire circumferential direction C, in order to ensure bonding strength of the fastener 11 to the resin layer 4, spacing between fusion bonded portions 11c adjacent in the tire circumferential direction is preferably not greater than 30 mm.

As illustrated in FIG. 2, the fastener 11 is used to attach an arbitrary affixture 20 to the inside surface of the pneumatic tire T. Specifically, a second fastener 21 that pairs with the fastener 11 is attached to the affixture 20, and the affixture 20 is attached to the tire inside surface via mutual engaging of this pair of fasteners 11 and 21. Note that the second fastener 21 constitutes another side (hook member) of the hook-and-loop surface fastener, and multiple hook-like engaging elements are provided on a top surface of the base material.

Examples of the affixture 20 include noise absorbing members formed from polyurethane foam or non-woven fabric. Examples of the affixture 20 other than noise absorbing members include temperature sensors, transponders, and the like.

In such a pneumatic tire T including the resin layer 4 on at least a portion of the tire inside surface, the resin layer 4 being formed from a thermoplastic resin or a thermoplastic elastomer composition, the pneumatic tire T uses a fastener 11 including the base material 11a formed from a thermoplastic resin and the engaging elements 11 formed on the base material 11a. Additionally, the base material 11a of the fastener 11 is fixed to the resin layer 4 via fusion bonding. Thereby, the fastener 11 can be strongly bonded to the resin layer 4 of the tire inside surface and, by extension, the affixture 20 that is attached to the fastener 11 can be strongly held.

Additionally, in the pneumatic tire T described above, a structure is used in which the fastener 11 (loop member), constituted by the sheet-like base material 11a formed from the woven fabric made from a thermoplastic resin and the multiple loop-like engaging elements 11 formed on the base material 11a, is fixed to the inside surface thereof. Loop members deform more pliably than hook members and, therefore are beneficial from the perspective of durability, especially at low temperatures.

When manufacturing the pneumatic tire T configured as described above, the pneumatic tire T having the resin layer 4 formed from a thermoplastic resin or a thermoplastic elastomer composition in which an elastomer is dispersed in a thermoplastic resin provided on the inside surface thereof is vulcanized, then the fastener 11 including the base material 11a formed from a thermoplastic resin and the engaging elements 11b formed on the base material 11a is disposed along the resin layer 4, and the base material 11a of the fastener 11 is fixed to the resin layer 4 via fusion bonding.

As a result of using the manufacturing method described above, crushing of the engaging elements 11 of the fastener 11 when vulcanizing can be avoided. Moreover, conventional molding and vulcanization processes of the pneumatic tire T may be used, while only simply adding a process of attaching the fastener 11 via fusion bonding. Additionally, a common fabrication operation can be used for any tire size because the fusion bonding is not dependent on tire size. Furthermore, when fusion bonding, in contrast with cases where an adhesive is used, there is no need to remove a mold release agent adhered to the inside surface of the pneumatic tire T after vulcanization.

Examples of the fusion bonding include ultrasonic fusion bonding, thermal fusion bonding, vibration fusion bonding, high-frequency fusion bonding, laser fusion bonding, spin fusion bonding, and similar processing methods and, particularly, from the standpoints of cost and bonding strength, ultrasonic fusion bonding is preferable. If ultrasonic fusion bonding is used, the base material 11a of the fastener 11 can be easily fixed to the resin layer 4 in a short period of time. Additionally, when dimensions of the fastener 11 are larger than necessary, fusion cutting may be performed at the same time as the fusion bonding.

Figure 6:
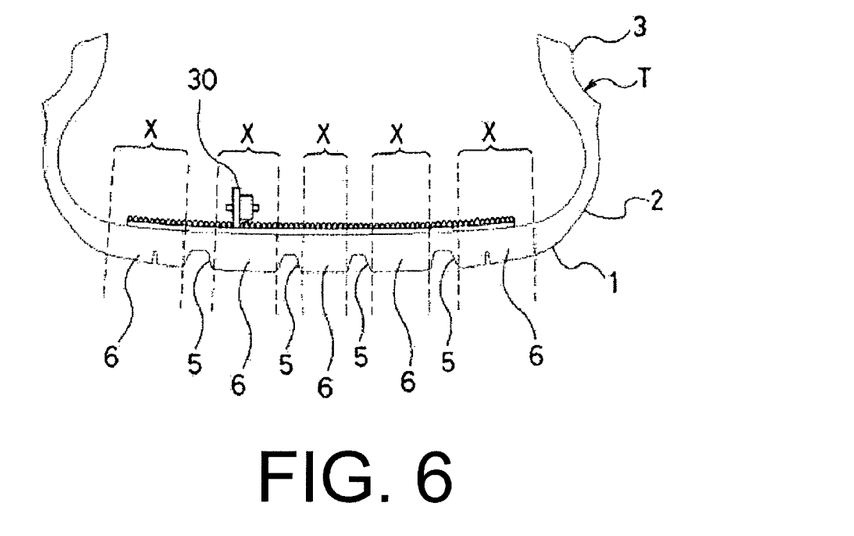
FIG. 6 is a cross-sectional view illustrating a state where ultrasonic fusion bonding is performed on the fastener.

FIG. 6 illustrates a state where ultrasonic fusion bonding is performed on the fastener. As illustrated in FIG. 6, a roller-type vibrator 30 may be used for the ultrasonic fusion bonding. The roller-type vibrator 30 is capable of continuously forming the fusion bonded portion 11c by rotating while imparting ultrasonic vibrations to the target of the fusion bonding. It is also possible to use a horn-type vibrator in addition to a roller-type vibrator as the vibrator 30.

A configuration in which the fastener 11 is disposed in the region of the inside surface of the pneumatic tire T corresponding to the tread portion 1 is beneficial because fusion bonding of the fastener 11 is easy and, moreover, durability of the resin layer 4 is excellent.

Additionally, in the pneumatic tire T including main grooves 5 extending straight in the tire circumferential direction in the tread portion 1, and a plurality of rows of land portions 6 partitioned by the main grooves 5, while the fastener 11 is disposed in a region of the inside surface of the tire T corresponding to the tread portion 1, the fusion bonding of the base material 11a of the fastener 11 is preferably performed continuously or intermittently along the tire circumferential direction at positions in the tire width direction corresponding to the land portions 6. That is, in FIG. 6, the fusion bonding is preferably performed in region X. In this case, pressure of the vibrator 30 when fixing the base material 11a of the fastener 11 to the resin layer 4 via fusion bonding will be supported by the land portions 6 and therefore processing accuracy can be enhanced. Note that here, "main grooves 5" refers to grooves that have a groove width in a contact patch of not less than 3.0 mm. The main grooves 5 having such dimensions may affect processing accuracy when fusion bonding, but narrower grooves have nearly no impact on processing accuracy.

In the pneumatic tire described above, a difference between the melting point of the base material 11a of the fastener 11 and the melting point of the resin layer 4 is preferably not greater than 40° C. and more preferably not greater than 30° C. Thereby, the base material 11a of the fastener 11 can be fixed to the resin layer 4 via fusion bonding and the bonding strength thereof can be sufficiently ensured. For example, when the melting point of the resin layer 4 is in a range from 180° C. to 250° C., the melting point of the base material 11a of the fastener 11 is preferably set lower than the melting point of the resin layer 4, in a range from 140° C. to 220° C.

Particularly, the constituent material of the base material 11a of the fastener 11 is preferably the same type of thermoplastic resin as the resin included in the resin layer 4. In this case, the melting point of both members will be the same and, moreover, compatibility of both resins will be excellent. Note that when the resin layer 4 is constituted from a thermoplastic elastomer composition, it is sufficient that the matrix resin be the same as the constituent material of the base material 11a of the fastener 11. A polyamide (nylon) or ethylene-vinyl alcohol copolymer (EVOH) is preferably used as this common constituent material.

Figure 7:
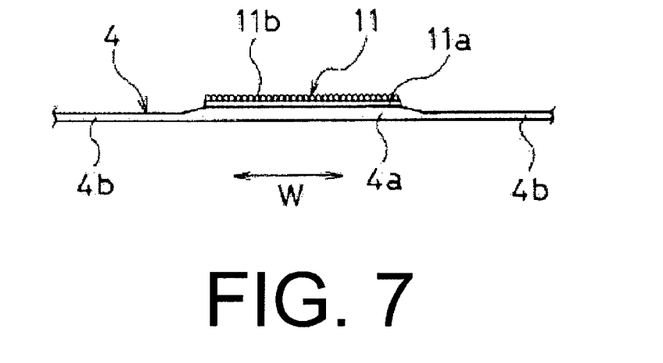
FIG. 7 is a cross-sectional view illustrating a structure in which a thickness of a portion of the resin layer where the fastener is attached is locally increased.

FIG. 7 illustrates a structure in which a thickness of a portion of the resin layer where the fastener is attached is increased. As illustrated in FIG. 7, a portion 4a of the resin layer 4 where the fastener 11 is fixed may be not less than 15% and preferably from 15% to 200% thicker than other portions 4b. The thicker portion 4a is selectively formed on a portion of the resin layer 4 in a tire width direction W. When fixing the base material 11a of the fastener 11 to the resin layer 4 via fusion bonding, localized thinning of the resin layer 4 may occur due to downward pressure of the vibrator 30, but functionality as an air barrier layer can be sufficiently maintained due to the thickness of the resin layer 4 being increased at the portion 4a where the fastener 11 is fixed.

Figure 8:
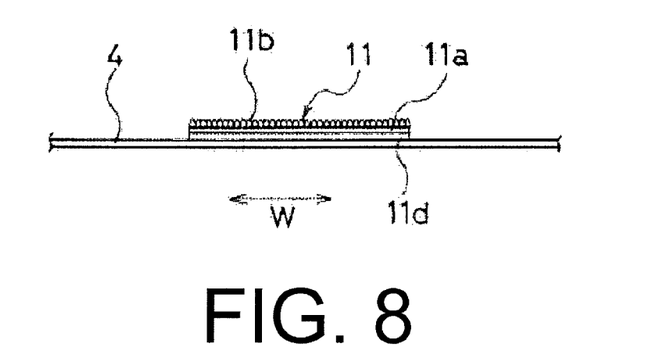
FIG. 8 is a cross-sectional view illustrating a structure in which the fusion bonding support film is laminated on a back side of the base material of the fastener.

FIG. 8 illustrates a structure in which the fusion bonding support film is laminated on a back side of the base material of the fastener. As illustrated in FIG. 8, a fusion bonding support film 11d formed from the same type of thermoplastic resin as the resin included in the resin layer 4 may be laminated in at least a region where the fusion bonding is performed, on a back side (side where the engaging elements 11b are not present) of the base material 11a of the fastener 11. The bonding strength between the fastener 11 and the resin layer 4 can be increased when such a fusion bonding support film 11d is added because the amount of dissolution of the resin when fusion bonding increases. This is particularly effective in cases where the base material 11a is constituted from a woven fabric. It is sufficient that a thickness of the fusion bonding support film 11d be set so as to be from 50% to 300% of the thickness of the resin layer 4.

Figure 9:
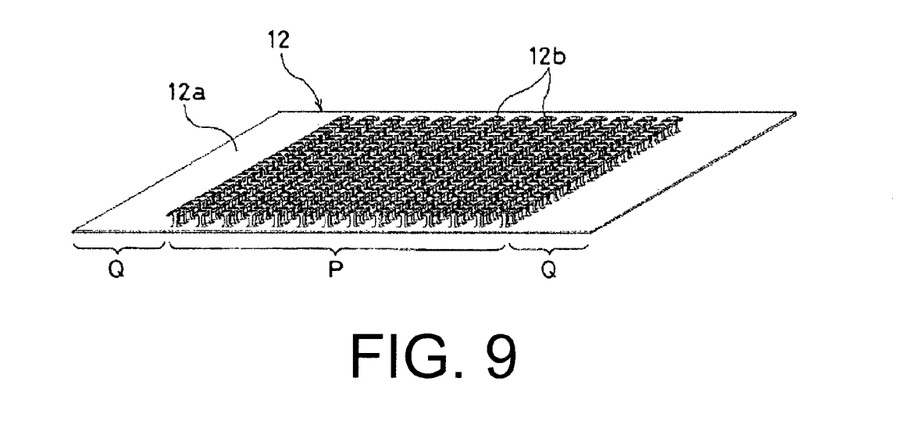
FIG. 9 is a perspective view illustrating a second fastener used in the present technology.
Figure 10:
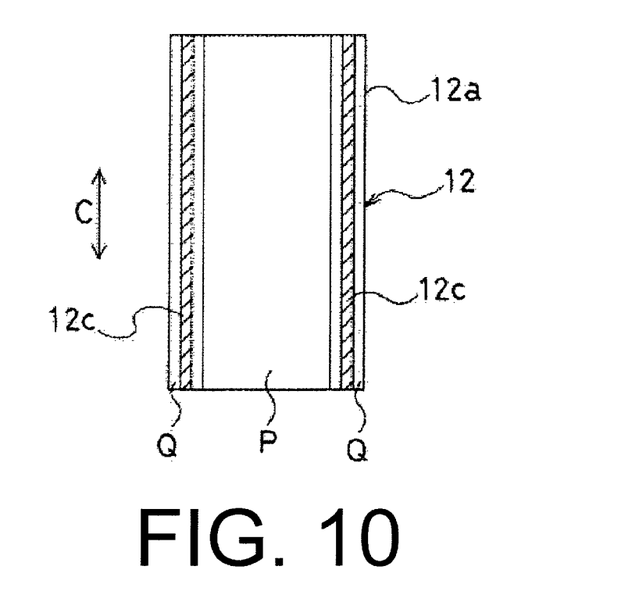
FIG. 10 is a plan view illustrating a state where the fastener of FIG. 9 is fusion bonded.

FIGS. 9 to 17 illustrate other fasteners used in the present technology. In FIG. 9, a fastener 12 is constituted from a sheet-like base material 12a made from a thermoplastic resin, and multiple protrusion-like engaging elements 12b that are formed on the base material 12a. The base material 12a and the engaging elements 12b are integrally molded via extrusion molding. The fastener 12 constitutes one side (hook member) of a hook-and-loop surface fastener. In this case, an element forming region P where the engaging elements 12b are disposed and a non-element forming region Q where the engaging elements 12b are not disposed are established in the fastener 12. When fusion bonding the base material 11a of such a fastener 12 to the resin layer 4, as illustrated in FIG. 10, a fusion bonded portion 12c of the fastener 12 (depicted by diagonal lines) is disposed in the non-element forming region Q.

Figure 11:
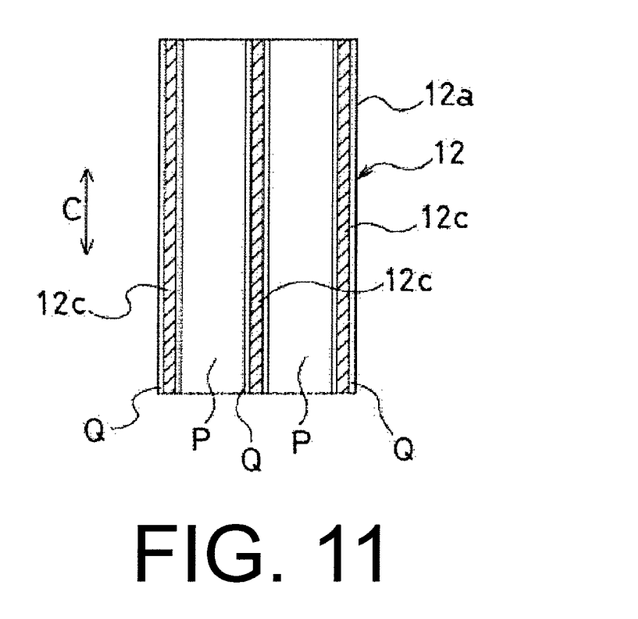
FIG. 11 is a plan view illustrating a state where the second fastener used in the present technology is fusion bonded.
Figure 12:
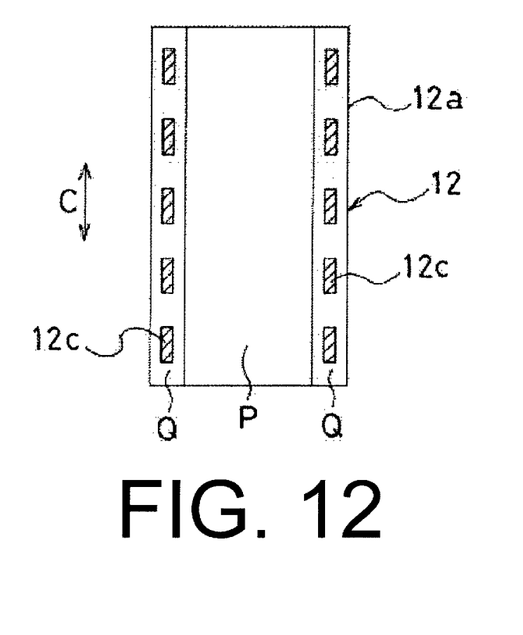
FIG. 12 is a plan view illustrating a state where another second fastener used in the present technology is fusion bonded.

Disposal of the element forming region P, the non-element forming region Q, and the fusion bonded portion 12c in the fastener 12 can be selected as desired. In FIG. 10, the non-element forming region Q is disposed on both sides of the element forming region P in the tire width direction; and the fusion bonded portion 12c is continuously formed in the non-element forming region Q along the tire circumferential direction. In FIG. 11, two rows of the element forming region P and three rows of the non-element forming region Q are alternately disposed in the tire width direction; and the fusion bonded portion 12c is continuously formed in the non-element forming region Q along the tire circumferential direction. In FIG. 12, the non-element forming region Q is disposed on both sides of the element forming region P in the tire width direction; and the fusion bonded portion 12c is intermittently formed in the non-element forming region Q along the tire circumferential direction.

Figure 13:
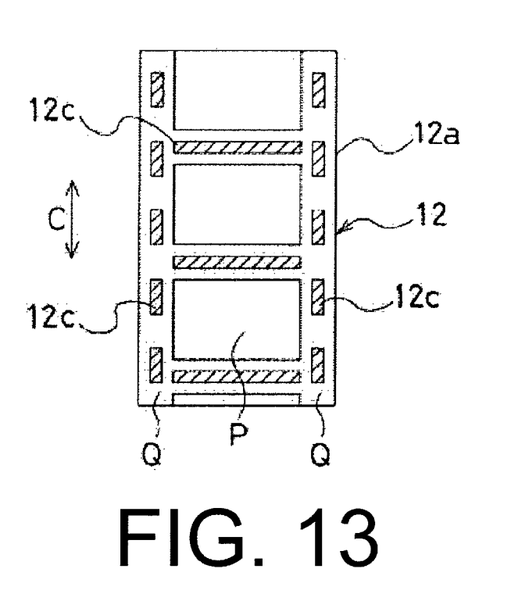
FIG. 13 is a plan view illustrating a state where another second fastener used in the present technology is fusion bonded.
Figure 14:
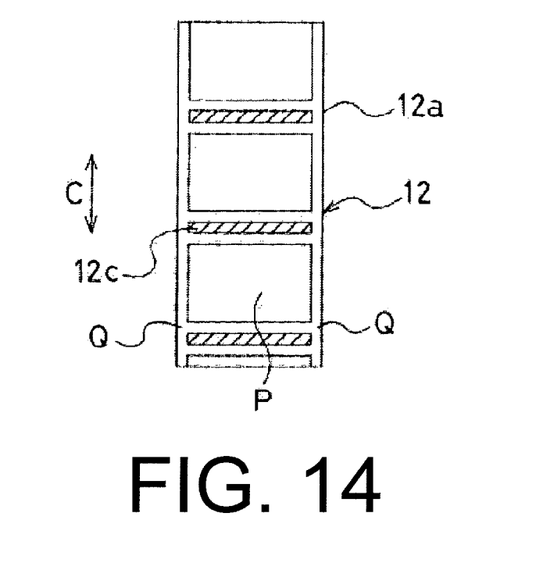
FIG. 14 is a plan view illustrating a state where another second fastener used in the present technology is fusion bonded.

In FIG. 13, the element forming region P is disposed intermittently along the tire circumferential direction; the non-element forming region Q is disposed between the element forming regions P that are adjacent in the tire circumferential direction and on both sides of the element forming regions P in the tire width direction; the fusion bonded portion 12c extending in the tire width direction is formed in the non-element forming region Q between the element forming regions P that are adjacent in the tire circumferential direction; and the fusion bonded portion 12c extending in the tire circumferential direction is intermittently formed in the non-element forming regions Q that are on both sides of the element forming region P in the tire width direction. In FIG. 14, the element forming region P is disposed intermittently along the tire circumferential direction; the non-element forming region Q is disposed between the element forming regions P that are adjacent in the tire circumferential direction and on both sides of the element forming regions P in the tire width direction; and the fusion bonded portion 12c extending in the tire width direction is formed in the non-element forming region Q between the element forming regions P that are adjacent in the tire circumferential direction.

Figure 15:
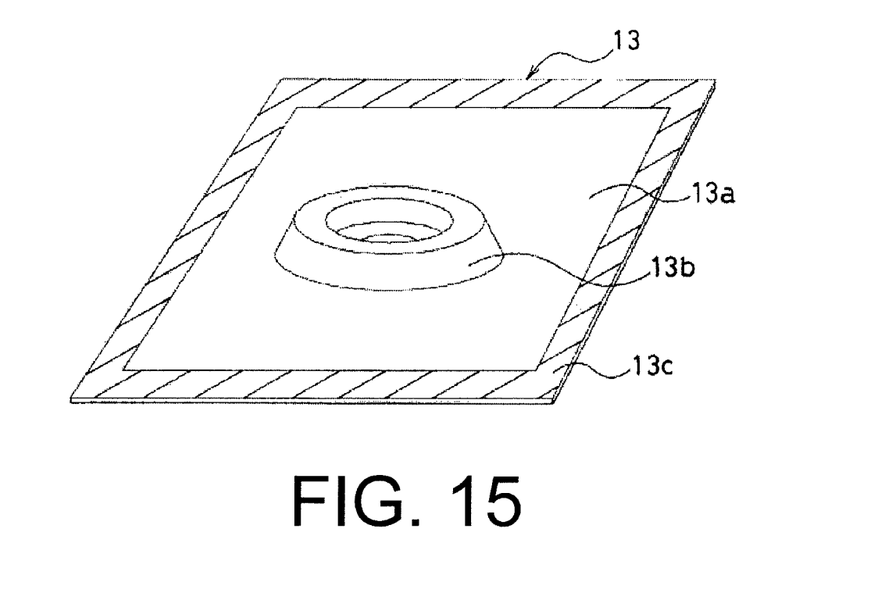
FIG. 15 is a perspective view illustrating a state where another second fastener used in the present technology is fusion bonded.

In FIG. 15, a fastener 13 is constituted from a sheet-like base material 13a made from a thermoplastic resin and an engaging element 13b having a female button form, formed on the base material 13a. When fusion bonding the base material 13a of such a fastener 13 to the resin layer 4, as illustrated in FIG. 15, a fusion bonded portion 13c of the fastener 13 (depicted by diagonal lines) is disposed on a peripheral portion of the base material 13a so as to surround the engaging element 13b.

Figure 16:
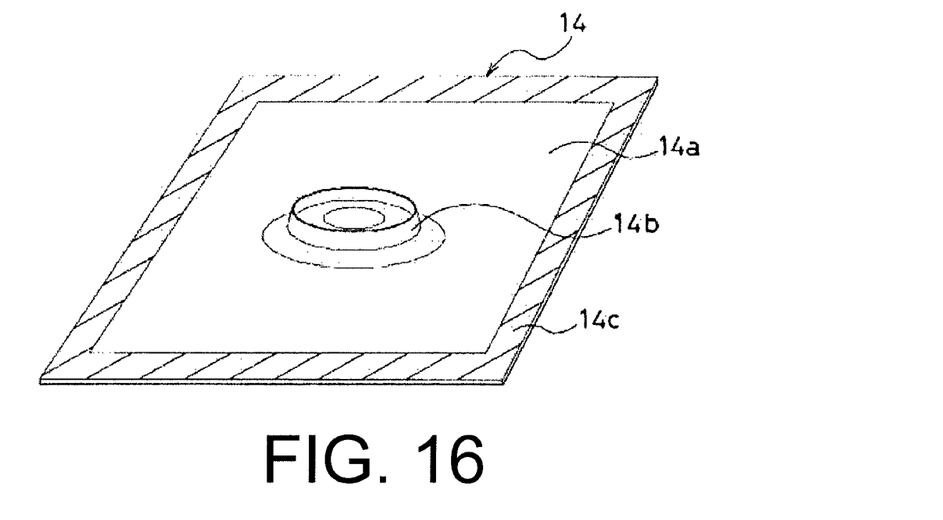
FIG. 16 is a perspective view illustrating a state where another second fastener used in the present technology is fusion bonded.

In FIG. 16, a fastener 14 is constituted from a sheet-like base material 14a made from a thermoplastic resin and an engaging element 14b having a male button form, formed on the base material 14a. When fusion bonding the base material 14a of such a fastener 14 to the resin layer 4, as illustrated in FIG. 16, a fusion bonded portion 14c of the fastener 14 (depicted by diagonal lines) is disposed on a peripheral portion of the base material 14a so as to surround the engaging element 14b.

Figure 17:
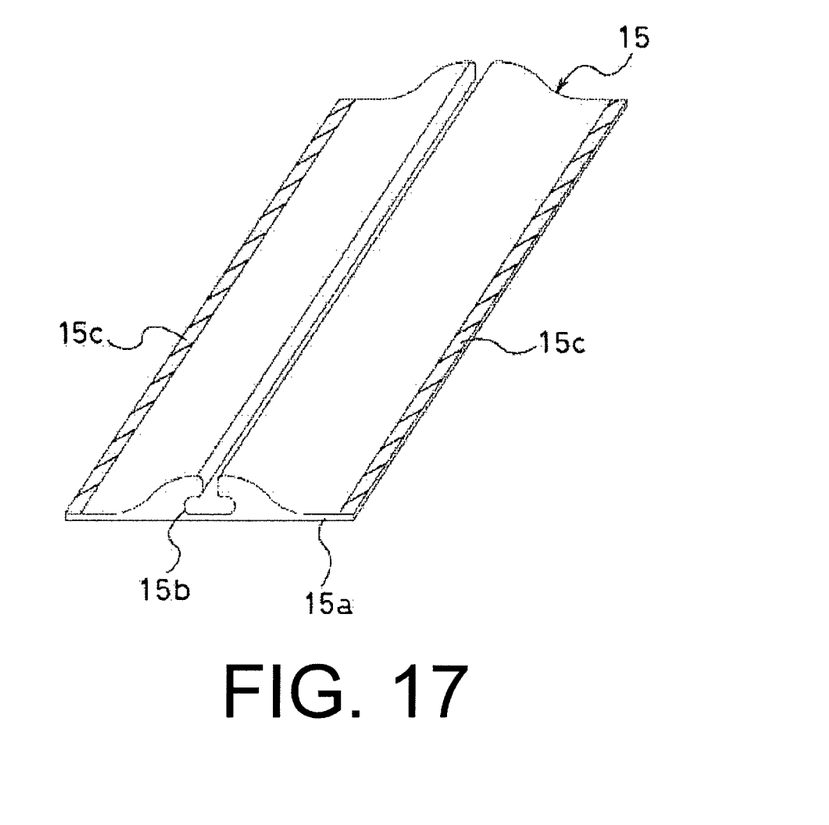
FIG. 17 is a perspective view illustrating a state where another second fastener used in the present technology is fusion bonded.

In FIG. 17, a fastener 15 is constituted from a sheet-like base material 15a made from a thermoplastic resin and an engaging element 15b having a groove form, formed on the base material 15a. When fusion bonding the base material 15a of such a fastener 15 to the resin layer 4, as illustrated in FIG. 17, a fusion bonded portion 15c of the fastener 15 (depicted by diagonal lines) is disposed on both edge portions of the base material 15a along a longitudinal direction of the engaging element 15b.

Thus, the form of the fastener used in the present technology is not particularly limited and fasteners having various forms can be used. Additionally, while an entirety of the fastener may be constituted from a thermoplastic resin, it is sufficient that at least the base material is made from a thermoplastic resin.

Hereinafter, the constituent material of the resin layer formed on the tire inside surface will be described in detail. As described above, the resin layer is constituted from a thermoplastic resin or a thermoplastic elastomer composition in which an elastomer is dispersed in a thermoplastic resin. Particularly, when forming the resin layer throughout an entirety of the tire inside surface as an air penetration preventing layer, a thermoplastic elastomer composition is preferably used as the constituent material of the resin layer.

Any thermoplastic resin having a Young's modulus greater than 500 MPa, and preferably from 500 to 3,000 MPa, can be used as the thermoplastic resin component of the thermoplastic elastomer composition; and a compounded amount thereof is not less than 10 wt. %, and preferably is from 20 to 85 wt. %, of a total weight of the polymer component including the elastomer and the resin.

Examples of such a thermoplastic resin include polyamide resins (e.g. nylon 6 (N6), nylon 66 (N66), nylon 46 (N46), nylon 11 (N11), nylon 12 (N12), nylon 610 (N610), nylon 612 (N612), nylon 6/66 copolymers (N6/66), nylon 6/66/610 copolymers (N6/66/610), nylon MXD6, nylon 6T, nylon 6/6T copolymers, nylon 66/PP copolymers, and nylon 66/PPS copolymers); polyester resins (e.g. aromatic polyesters such as polybutylene terephthalate (PBT), polyethylene terephthalate (PET), polyethylene isophthalate (PEI), polybutylene terephthalate/tetramethylene gylcol copolymers, PET/PEI copolymers, polyarylate (PAR), polybutylene naphthalate (PBN), liquid crystal polyester, and polyoxyalkylene diimidic diacid/polybutylene terephthalate copolymers); polynitrile resins (e.g. polyacrylonitrile (PAN), polymethacrylonitrile, acrylonitrile/styrene copolymers (AS), (meth) acrylonitrile/styrene copolymers, and (meth)acrylonitrile/ styrene/butadiene copolymers); poly(meth)acrylate resins (e.g. polymethylmethacrylate (PMMA), polyethylmethacrylate, ethylene ethyl acrylate copolymers (EEA), ethylene acrylate copolymers (EAA), and ethylene methyl acrylate resins (EMA)); polyvinyl resins (e.g. vinyl acetate (EVA), polyvinylalcohol (PVA), vinyl alcohol/ethylene copolymers (EVOH), polyvinylidene chloride (PVDC), polyvinyl chloride (PVC), vinyl chloride/vinylidene chloride copolymers, and vinylidene chloride/methylacrylate copolymers); cellulose resins (e.g. cellulose acetate and cellulose acetate butyrate); fluorine resins (e.g. polyvinylidene fluoride (PVDF), polyvinyl fluoride (PVF), polychlorofluoroethylene (PCTFE), and tetrafluoroethylene/ethylene copolymers (ETFE)); imide resins (e.g. aromatic polyimide (PI)); and the like. These thermoplastic resins may be used as individual resin materials, free of elastomer components.

Any elastomer with a Young's modulus of 500 MPa or less or an elastomer composition in which a necessary amount of a reinforcing agent, a filler, a cross-linking agent, a softener, an antiaging agent, a processing aid, or other similar compounding agent has been added in order to improve the dispersability, heat resistance, or the like of the elastomer can be used as the elastomer component of the thermoplastic elastomer composition; and a compounded amount thereof is not less than 10 wt. %, and preferably is from 10 to 80 wt. %, of a total weight of the polymer component including the elastomer and the resin.

Examples of such an elastomer include diene rubbers and hydrogenates thereof (e.g. NR, IR, epoxidized natural rubber, SBR, BR (high-cis BR and low-cis BR), NBR, hydrogenated NBR, and hydrogenated SBR); olefin rubbers (e.g. ethylene propylene rubber (EPDM, EPM), maleated ethylene propylene rubber (M-EPM); butyl rubber (IIR); isobutylene and aromatic vinyl or diene monomer copolymers; acrylic rubber (ACM); ionomer; halogen-containing rubbers (e.g. Br-IIR, Cl-IIR, brominated copolymer of isobutylene/para-methyl styrene (Br-IPMS), chloroprene rubber (CR), hydrin rubber (CHC, CHR), chlorosulfonated polyethylene (CSM), chlorinated polyethylene (CM), and maleated chlorinated polyethylene (M-CM)); silicone rubbers (e.g. methyl vinyl silicone rubber, di-methyl silicone rubber, and methyl phenyl vinyl silicone rubber); sulfur-containing rubbers (e.g. polysulfide rubber); fluororubbers (e.g. vinylidene fluoride rubbers, fluorine-containing vinyl ether rubbers, tetrafluoroethylene-propylene rubbers, fluorine-containing silicone rubbers, and fluorine-containing phosphazene rubbers); thermoplastic elastomers (e.g. styrene elastomers, olefin elastomers, polyester elastomers, urethane elastomers, and polyamide elastomers); and the like.

Another polymer and compounding agent such as a compatibility agent can be compounded in the thermoplastic elastomer composition as a third component in addition to the essential components described above. Examples of purposes for compounding other polymers include improving compatibility between the thermoplastic resin component and the elastomer component, improving film-formability of the material, improving heat resistance, reducing costs, and the like. Examples of materials used to accomplish these purposes include polyethylene, polypropylene, polystyrene, ABS, SBS, polycarbonate, and the like.

The thermoplastic elastomer composition is obtained by melt-kneading the thermoplastic resin and the elastomer (which is unvulcanized when rubber is used) in advance using a bi-axial kneader/extruder or the like, and dispersing the elastomer component in the thermoplastic resin that forms a continuous phase. When vulcanizing the elastomer component, a vulcanizing agent may be added while kneading so as to dynamically vulcanize the elastomer. Although various compounding agents (except for vulcanizing agents) may be added to the thermoplastic resin or the elastomer component during the kneading, it is preferable to premix the compounding agents before the kneading. The kneader used for kneading the thermoplastic resin and the elastomer is not particularly limited, and examples thereof include screw extruders, kneaders, Banbury Mixers, bi-axial kneader/extruders, and the like. Among these, a bi-axial kneader/extruder is preferably used for kneading the resin component and the rubber component and for dynamically vulcanizing the rubber component. Furthermore, two or more types of kneaders can be used to perform successive kneading. As a condition for the melt kneading, it is sufficient that the temperature is equal to or higher than the temperature at which the thermoplastic resin melts. A shear rate when kneading is preferably from 2,500 to 7,500 sec$^{-1}$. A total kneading time is from 30 seconds to 10 minutes. Additionally, when a vulcanizing agent is added, a vulcanization time after said addition is preferably from 15 seconds to 5 minutes. The thermoplastic elastomer composition fabricated according to the method described above is formed into a film via molding using a resin extruder or calender molding. A regular film forming process for thermoplastic resins or thermoplastic elastomers can be used for the film forming.

The thermoplastic elastomer composition described above is formed into a sheet or film state and used in tire molding in this state. However, an adhesive layer may be laminated in order to increase adhesion of said sheet or film to the adjacent rubber. Specific examples of an adhesive polymer that constitutes the adhesive layer include an ultra high molecular weight polyethylene (UHMWPE) having a molecular weight of not less than 1,000,000 and preferably not less than 3,000,000; acrylate copolymers such as ethylene-ethylacrylate copolymers (EEA), ethylene-methylacrylate resins (EMA), and ethylene-acrylic acid copolymers (EAA), and maleic anhydrate adducts thereof; polypropylene (PP) and maleic acid-modified products thereof; ethylene-propylene copolymers and maleic acid-modified products thereof; polybutadiene resins and maleic anhydrate-modified products thereof, styrene-butadiene-styrene copolymers (SBS); styrene-ethylene-butadiene-styrene copolymers (SEBS); thermoplastic fluororesins; thermoplastic polyester resins; and the like. A thickness of the adhesive layer is not particularly limited, but is preferably small in order to reduce tire weight; and is preferably from 5 μm to 150 μm.

Working Examples

Tires for Working Examples 1 to 4 having a tire size of 215/60R16 were fabricated by vulcanizing a pneumatic tire having a resin layer on a tire inside surface, the resin layer being formed from a thermoplastic elastomer composition in which an elastomer is dispersed in a thermoplastic resin; thereafter, disposing a surface fastener including a base material made from a thermoplastic resin and engaging elements formed on the base material in a region corresponding to a tread portion of the tire inside surface; and fixing the base material of the surface fastener to the resin layer by ultrasonic fusion bonding. Nylon was used for both the matrix resin of the resin layer and the resin of the base material of the surface fastener.

With the tire of Working Example 1, the surface fastener illustrated in FIG. 3 (loop member) was fixed to the tire inside surface via ultrasonic fusion bonding, and the fusion bonded portion thereof was formed continuously in the tire circumferential direction, as illustrated in FIG. 4.

The configuration of the tire of Working Example 2 was the same as that of Working Example 1, with the exception that the portion of the resin layer where the surface fastener was fixed was made 15% thicker than the other portions.

The configuration of the tire of Working Example 3 was the same as that of Working Example 1, with the exception that the fusion bonding support film, formed from the same type of thermoplastic resin as the resin included in the resin layer, was laminated on the back side of the base material of the surface fastener. A thickness of the fusion bonding support film was 50% of the thickness of the resin layer.

With the tire of Working Example 4, the surface fastener illustrated in FIG. 9 (hook member) was fixed to the tire inside surface via ultrasonic fusion bonding, and the fusion bonded portion thereof was formed continuously in the tire circumferential direction, as illustrated in FIG. 10.

Additionally, for comparison, a tire of Comparison Example 1 was fabricated by using an adhesive to attach a surface fastener (loop member) in the region corresponding to the tread portion of the tire inside surface.

Bonding conditions of the surface fastener of each of these test tires were evaluated according to the following evaluation methods.

Bonding condition of the surface fastener: a noise absorbing member including a second surface fastener that pairs with the surface fastener on the tire inside surface, was attached to the tire inside surface by mutually engaging this pair of surface fasteners and, in this state, drum testing was conducted at an air pressure of 120 kPa and a load of 5 kN. Then, the bonding condition of the surface fastener after running for 10,000 km was confirmed.

As a result, with the tires of Working Examples 1 to 4, there was absolutely no peeling of the surface fasteners after the testing. In contrast, with Comparative Example 1, in which the surface fastener was attached to the resin layer using an adhesive, after testing, a portion of the surface fastener had peeled from the resin layer and the noise absorbing member was in an unstable state.

What is claimed is:

1. A pneumatic tire having a resin layer on at least a portion of a tire inside surface, the resin layer being formed from a thermoplastic resin or a thermoplastic elastomer composition comprising an elastomer dispersed in a thermoplastic resin, comprising:
   a fastener including a base material formed from a thermoplastic resin and an engaging element formed on the base material, wherein
     the base material of the fastener is fixed to the resin layer via fusion bonding,
     the engaging element is a hook member or a loop member of a hook-and-loop surface fastener, or the engaging element has a female button form, a male button form or a groove form, and
     the fastener having an element forming region where the engaging elements are disposed and a non-element forming region where the engaging elements are not disposed, and the fusion bonding being disposed in the non-element forming region; and
   main grooves extending straight in a tire circumferential direction in a tread portion, and a plurality of rows of land portions partitioned by the main grooves; wherein
     the fastener is disposed in a region of the tire inside surface corresponding to the tread portion,
     the fusion bonding of the base material of the fastener is performed continuously or intermittently along the tire circumferential direction at positions in the tire width direction corresponding to the land portions, and
     the fusion bonding is not performed at positions in the tire width direction corresponding to the main grooves.

2. The pneumatic tire according to claim 1, wherein a difference between a melting point of the base material of the fastener and a melting point of the resin layer is not greater than 40° C.

3. The pneumatic tire according to claim 1, wherein a constituent material of the base material of the fastener is the same type of thermoplastic resin as the resin included in the resin layer.

4. The pneumatic tire according to claim 1, wherein a portion of the resin layer where the fastener is fixed is not less than 15% thicker than other portions.

5. The pneumatic tire according to claim 1, wherein a fusion bonding support film formed from the same type of thermoplastic resin as the resin included in the resin layer is laminated in at least a region where the fusion bonding is performed, on a back side of the base material of the fastener.

6. The pneumatic tire according to claim 1, wherein an affixture comprising a second fastener that pairs with the fastener is attached to the tire inside surface by this pair of fasteners being mutually engaged.

7. The pneumatic tire according to claim 6, wherein the affixture is a noise absorbing member.

8. The pneumatic tire according to claim 1, wherein the base material is formed from a woven fabric made from a thermoplastic resin.

9. The pneumatic tire according to claim 1, wherein the fusion bonding is ultrasonic fusion bonding, vibration fusion bonding, high-frequency fusion bonding, laser fusion bonding or spin fusion bonding.

10. The pneumatic tire according to claim 1, wherein the fusion bonding is disposed continuously or intermittently on both edge potions of the base material along the tire circumferential direction and the fusion bonding is not disposed on a center of the base material.

11. The pneumatic tire according to claim 1, wherein the non-element forming region is disposed on both sides of the element forming region in the tire width direction, and the fusion bonding is continuously or intermittently formed in the non-element forming region along the tire circumferential direction.

12. The pneumatic tire according to claim 1, wherein two rows of the element forming region and three rows of the non-element forming region are alternately disposed in the tire width direction, and the fusion bonding is continuously formed in the non-element forming region along the tire circumferential direction.

13. The pneumatic tire according to claim 1, wherein the element forming region is disposed intermittently along the tire circumferential direction, the non-element forming region is disposed between the element forming regions that are adjacent in the tire circumferential direction and on both sides of the element forming regions in the tire width direction, the fusion bonding extending in the tire width direction is formed in the non-element forming region between the element forming regions that are adjacent in the tire circumferential direction, and the fusion bonding extending in the tire circumferential direction is intermittently formed in the non-element forming regions that are on both sides of the element forming region in the tire width direction.

14. The pneumatic tire according to claim 1, wherein the element forming region is disposed intermittently along the tire circumferential direction, the non-element forming region is disposed between the element forming regions that are adjacent in the tire circumferential direction and on both sides of the element forming regions in the tire width direction, and the fusion bonding extending in the tire width direction is formed in the non-element forming region between the element forming regions that are adjacent in the tire circumferential direction.

15. The pneumatic tire according to claim 1, wherein the fusion bonding is formed intermittently along the tire circumferential direction, and spacing between portions of the fusion bonding adjacent in the tire circumferential direction is not greater than 30 mm.

16. The pneumatic tire according to claim 1, wherein the engaging element has a female button form, a male button form or a groove form.

17. A method for manufacturing a pneumatic tire comprising:
   vulcanizing a pneumatic tire having a resin layer on at least a portion of a tire inside surface, the resin layer being formed from a thermoplastic resin or a thermoplastic elastomer composition comprising an elastomer dispersed in a thermoplastic resin; thereafter, disposing a fastener including a base material formed from a thermoplastic resin and an engaging element formed on the base material along the resin layer in a region of the tire inside surface corresponding to a tread portion, the engaging element being a hook member or a loop member of a hook-and-loop surface fastener, or the engaging element having a female button form, a male button form or a groove form; the fastener having an element forming region where the engaging elements are disposed and a non-element forming region where the engaging elements are not disposed fixing the base material of the fastener to the resin layer in a region of the tire inside surface corresponding to the tread portion by fusion bonding in the non-element forming region and continuously or intermittently along the tire circumferential direction at positions in the tire width direction corresponding to a plurality of rows of land portions partitioned by main grooves extending straight in a tire circumferential direction in the tread portion, without performing the fusion bonding at positions in the tire width direction corresponding to the main grooves.

18. The method for manufacturing a pneumatic tire according to claim 17, wherein the base material of the fastener is fixed to the resin layer via ultrasonic fusion bonding.

19. The method for manufacturing a pneumatic tire according to claim 17, wherein a difference between a melting point of the base material of the fastener and a melting point of the resin layer is not greater than 40° C.

20. The method for manufacturing a pneumatic tire according to claim 17, wherein a constituent material of the base material of the fastener is the same type of thermoplastic resin as the resin included in the resin layer.

21. The method for manufacturing a pneumatic tire according to claim 17, wherein a portion of the resin layer where the fastener is fixed is not less than 15% thicker than other portions.

22. The method for manufacturing a pneumatic tire according to claim 17, wherein a fusion bonding support film formed from the same type of thermoplastic resin as the resin included in the resin layer is laminated in at least a region where the fusion bonding is performed, on a back side of the base material of the fastener.

23. The method for manufacturing a pneumatic tire according to claim 17, comprising attaching an affixture comprising a second fastener that pairs with the fastener to the tire inside surface by mutually engaging this pair of fasteners.

24. The method for manufacturing a pneumatic tire according to claim 23, wherein the affixture is a noise absorbing member.

25. The method for manufacturing a pneumatic tire according to claim 17, wherein:

the fixing the base material of the fastener to the resin layer by fusion bonding comprises fixing the base material by intermittent fusion bonding along the tire circumferential direction such that spacing between fusion bonded portions adjacent in the tire circumferential direction is not greater than 30 mm;

a difference between a melting point of the base material of the fastener and a melting point of the resin layer is not greater than 30° C.; and the thermoplastic resin comprises a Young's modulus of from 500 to 3,000 MPa, and a compounded amount thereof is from 20 to 85 wt. %, of a total weight of a polymer component including the elastomer and the resin.

* * * * *